United States Patent

[11] 3,582,827

| [72] | Inventor | Bjourn E. Bjerede |
| | | 498 Fairwood Circle, Rochester, N.Y. 14623 |
| [21] | Appl. No. | 769,069 |
| [22] | Filed | Oct. 21, 1968 |
| [45] | Patented | June 1, 1971 |
| [32] | Priority | Apr. 27, 1965 |
| [33] | | Sweden |
| [31] | | 5473/65 |

[54] OSCILLATOR WITH PHASE-SHIFTING TUNING CAPACITANCE IN PARALLEL WITH FREQUENCY SENSITIVE FEEDBACK NETWORK
2 Claims, 8 Drawing Figs.

[52] U.S. Cl. .................................... 331/135, 324/61, 331/65, 331/177
[51] Int. Cl. .................................... H03b 5/00

[50] Field of Search............................................. 331/65, 108.4, 110, 116, 135—137, 141, 142, 177; 324/60, 61

[56] References Cited
UNITED STATES PATENTS
| 3,046,491 | 7/1962 | Lackoff...................... | 331/116X |
| 3,206,697 | 9/1965 | Martens...................... | 331/141 |

*Primary Examiner*—John Kominski
*Assistant Examiner*—Siegfreid H. Grimm
*Attorney*—Fred C. Philpitt

ABSTRACT: A low frequency oscillator having a frequency sensitive feedback network between its output and input is tuned by one or two separate feedback paths containing variable capacitance means operative to vary the phase shift of currents flowing in said feedback network.

OSCILLATOR WITH PHASE-SHIFTING TUNING CAPACITANCE IN PARALLEL WITH FREQUENCY SENSITIVE FEEDBACK NETWORK

The present application comprises a continuation-in-part of my prior copending application Ser. No. 545,734 filed Apr. 27, 1966, for "Oscillator Circuit for the Measurement of Capacitance Differences," now abandoned.

Capacitive transducers are capable of precise indication of mechanical position, without disturbing the object under test with static or dynamic forces. In spite of these advantages they have not been uses nearly as much as many other types of transducers e.g. differential transformers, potentiometers or strain gauges. Compared with other common types of transducers for mechanical measurements, capacitive transducers offer the following advantages:

a. forces between transducer plates are usually negligible;
b. mass of the transducer can be made very small by proper design;
c. mechanical dimensional stability is very good particularly when materials such as quartz and invar are used;
d. capacitive transducers are easily shielded against external electric stray fields and are not at all affected by magnetic stray fields.

Capacitive transducers are previously known making use of an RF-oscillator, tuned by the transducer capacitor inserted in the tank circuit. By mixing the frequency of the transducer oscillator with another, constant frequency, an LF-signal having a frequency corresponding to the transducer capacitance is generated. It is very difficult, however, to achieve a stable frequency in the range 20—40 Hz. by this method, partly because stray capacitances in the tuning circuit add to the transducer capacitance, and partly because the output frequency represent the difference between two nearly equal frequencies and thus accentuates relative errors and instabilities in the frequency of the transducer oscillator.

By means of bridge circuits e.g. comprising a transformer, a capacitance to be varied, a reference capacitance, a detector, a generator and a variable transformer, capacitance measurements can be made more or less independent of stray capacitances to ground. However, these measurements can only indicate if the capacitance to be measured is larger or smaller than a certain capacitance value corresponding to the reference capacitor in the bridge, and not to what extent the measured capacitance exceed or goes below said capacitance value.

The present invention relates to a method and circuits for changing the frequency of an oscillator by coupling a single or differential capacitor between the output and the input of an oscillator amplifier.

One object of the present invention is to achieve a measuring device in which a small single or differential capacitors determine the frequency of the output signal from the oscillator so that the value of the small single or differential capacitance can be exactly measured within a certain interval.

Another object of the invention is to achieve a stable frequency within this interval in the range 20—40 Hz.

Still another object is to obtain a good linearity between the tuning capacitance or differential capacitance determining the oscillation frequency and the period of said frequency.

Still another object is to achieve large frequency variations by the variation of a small single capacitance.

Embodiments of the invention will now be described and discussed with reference to the accompanying drawings of which FIG. 1 shows a bridge-stabilized oscillator having a frequency-sensitive and an amplitude depending feedback network;

Figure 1:
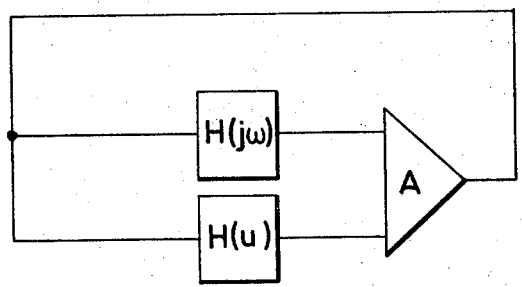
Figure 2:
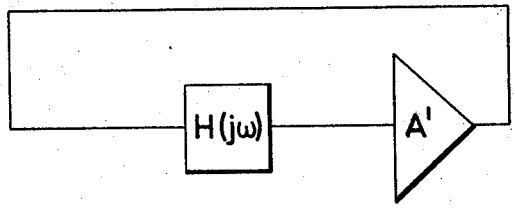
FIG. 2 shows a bridge-stabilized oscillator according to FIG. 1, in which the amplitude dependent feedback network is included in the amplifier.

A bridge-stabilized oscillator has a differential input and makes use of two separate feedback networks as shown in FIG. 1. One of the feedback networks $H(jw)$ is frequency dependent and the other $H(U)$ is amplitude dependent. The amplitude-sensitive feedback network provides uniform feedback at all frequencies. The feedback from this path is dependent on the amplitude of oscillation, providing automatic correction for variations of the amplifier gain. The total feedback is the difference between the outputs of the two networks obtained by feeding them to the differential inputs of the oscillator amplifier A. It is, however, convenient to regard the amplitude-sensitive network $H(U)$ as part of the amplifier. The equivalent circuits will then be the one shown in FIG. 2 with an amplitude dependent amplification. The amplification $A'$ is determined by Barkhausen's condition for oscillation, which states that the loop gain must be unity at the resonant frequency $w_o$.

Thus $A' = H(jw_o)$

Figure 3:
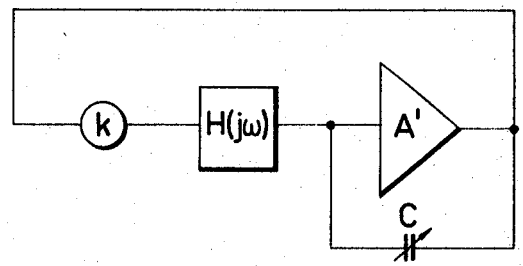
FIG. 3 illustrates an oscillator tuned by a small capacitor, where the frequency-sensitive feedback network is fed through a voltage divider.

According to the invention the frequency of an oscillator can be changed by coupling a single capacitor C between the output and the input of the oscillator amplifier $A'$ according to FIG. 3. A variation of the capacitance will result in a phase shift of the current through the feedback network which in turn results in a change of the oscillator frequency. In this way the frequency can be varied by varying the capacitor. If the capacitance C is small compared to the level of capacitance in the frequency-sensitive feedback network $H(jw)$, there will only be a small effect on the frequency. LF-oscillators have an inherently high level of capacitance, and in order to achieve large frequency variations the original frequency-sensitive feedback network is fed through a voltage divider $k$ as shown in FIG. 3. This increases the influence on the input voltage of the oscillator.

Figure 4:
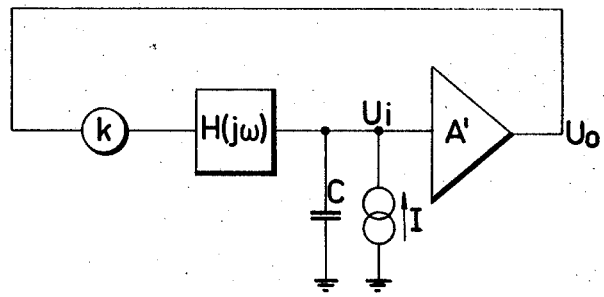
FIG. 4 shows an equivalent circuit of the oscillator in FIG. 1.

In FIG. 4 the input voltage $U_i$ and output voltage $U_o$ of the oscillator amplifier $A'$ have been introduced. The influence of the capacitor C is represented by a constant-current source of magnitude $I$ shunted by $C$. The current will flow mainly through the output impedance of the feedback network, thus giving a potential drop which will add to the original voltage from the network. When C is small compared to the level of capacitance in the feedback network, $$I(jw) = jwCU_o(jw), \quad (1)$$

and $$U_i(jw) = kHU_o(jw) + I(jw)Z_o, \quad (2)$$

where $k=$ the attenuation of the voltage divider, $H=$ the transmission of the frequency-sensitive network, and $Z_o=$ the output impedance of the frequency-sensitive network. The total transmission $H'$ can be derived from (1) and (2), with the result $$H' = U_i/U_o = kH + jwCZ_o \quad (3)$$

Figure 5:
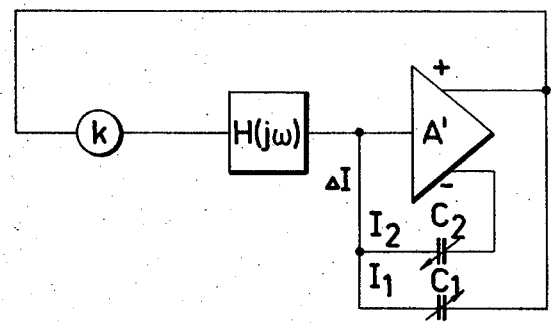
FIG. 5 shows an oscillator tuned by a differential capacitor.

The frequency of an oscillator with balanced outputs can be tuned by a differential capacitor inserted as in FIG. 5. Balanced outputs means that the output voltages have equal amplitudes but opposite phases. The currents $I_1$ and $I_2$ through the capacitors $C_1$ and $C_2$ have opposite directions and cause a current $\Delta I$ to flow through the low output impedance of the feedback network. When $U_o \gg AU_i$, $$I = I_1 - I_2 = jwC_1U_o - jwC_2U_o = jw\Delta CU_o, \quad (4)$$

where $\Delta C = C_1 - C_2 =$ the capacitance of the differential capacitor, and $U_o=$ the output voltage.

The input voltage of the oscillator is $$U_i = {}_o + \Delta_o \quad (5)$$

and the total transmission $H'$ is $$H' = kH + jw\Delta CZ_o \quad (6)$$

Thus, to a first-order approximation, the frequency depends on $\Delta C$ only and not on the arithmetic mean $C_o$ of $C_1$ and $C_2$, $$C_o = (C_1 + C_2)/2 \quad (7)$$

This is a very favorable circumstance in transducer application. Of course, $C_o$ does have some influence on the oscillator frequency. The ratio between the influence of $\Delta C$ and the influence of $C_o$ is one measure of quality of the oscillator.

Figure 6:
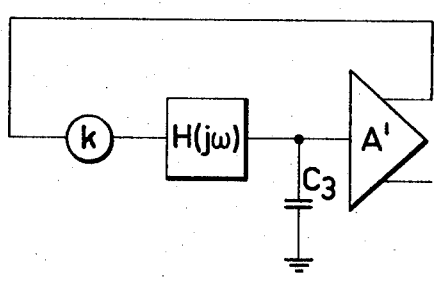
FIG. 6 shows an equivalent circuit of the oscillator in FIG. 3.

The capacitor $C_1$ in FIG. 5 can be represented by a capacitor $(1-A')C_1$ inserted between the oscillator input and ground. In the same way $C_2$ can be represented by a capacitor $(1+A')C_2$. The circuit in FIG. 6 is equivalent to the circuit in FIG. 5 if $$C_3 = (1-A')C_1 + (1+A')C_2 \quad (8)$$

This can be rewritten as $$C_3 = 2aC_o - A'\Delta C \quad (9)$$

The total influence of the differential capacitor is represented by $C_3$. Hence $\Delta C$ has $A'/2$ times greater influence on the oscillator frequency than $C_o$. The advantage of a large amplification $A'$ is that $C_3$ will have a large value, which has the following consequences:

1. high tuning sensitivity,
2. small influence from stray capacitances shunting the amplifier input (since they are in parallel with $C_3$)
3. variations in $\Delta C = C_1 - C$ have much larger influence on the period than variations in $C_1 + C_2$.

Figure 7:
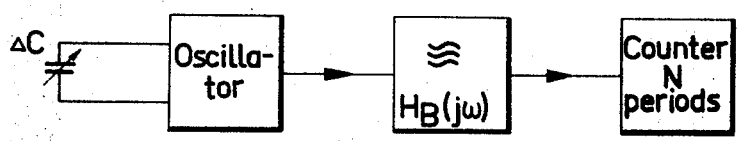
FIG. 7 shows a measuring system according to the invention.

The main drawback of a large amplification is the decreased signal-to-noise ratio. There is a practical upper limit of the output voltage, since when the amplification is increased the amplifier input voltage $U_i = U_o/A'$ must decrease. This causes the ratio between input signal and equivalent input noise to decrease, and thus the short term stability to deteriorate. The effect of variations in input stray capacitance is thus proportional to $1/A'$, whereas the affect of inherent noise is proportional to $A'$. For a certain value $A'_{opt}$ of the amplification, these effects are equal in magnitude and the sum of the two effects is a minimum. In finding the relation between noise and short term stability, the complete system including the transmission link and the period-measuring device must be taken into account. The measuring system is shown in FIG. 7, in which the transmission link is represented by a filter $H_R(jw)$ and the period measuring device by a counter, which measures the time elapsed between the beginning of one period and the end of the $n$th following period.

Figure 8:
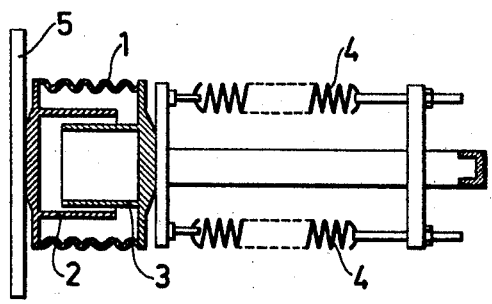
FIG. 8 shows a pressure transducer with capacitive output.

So far the applications of the method according to the invention have been the measurement of air pressure, speed of wind and direction of wind, but, of course, many other applications could easily be found e.g. in conversion of the deflection of a moving coil instrument into a time quantity. In the case of air pressure a stability better than $10^{13}$ of the total range is required. One embodiment of transducer for air pressure is shown in FIG. 8. This transducer comprises an evacuated aneroid 1 which is kept in position by springs 4. The length of the aneroid, which indicates the air pressure, is sensed by a differential capacitor mounted on two concentric quartz tubes 2 and 3 inside the aneroid 1. The transducer oscillator is mounted under the bottom plate 5, in order to make the length of the cable connecting the tuning capacitor with the oscillator input as short as possible. The sensitivity of the transducer is 0.04 pF/mb.

What I claim is:

1. A low frequency oscillator comprising amplifier means, a frequency-sensitive feedback network connected between output and input of said amplifier means, tuning means for said oscillator comprising variable capacitance means connected between said output and said input of said amplifier and forming at least one feedback path separated from said feedback network, said capacitance means being operative to vary the phase shift of current in said frequency-sensitive feedback network thereby to change the output frequency of said oscillator, the improvement wherein said output of said amplifier means comprises a pair of balanced outputs producing output voltages having equal amplitudes but opposite phases, said variable capacitance means comprising a pair of capacitors forming differential capacitance means, said capacitors each being connected to one of said balanced outputs.

2. The oscillator of claim 1, wherein a voltage divider is connected between the output of said amplifier means and the input of said frequency-sensitive feedback network.